United States Patent
Harkins

(10) Patent No.: US 9,238,760 B2
(45) Date of Patent: Jan. 19, 2016

(54) CHARGE COLLECTION SIDE ADHESIVE TAPE

(71) Applicant: ADHESIVES RESEARCH, INC., Glen Rock, PA (US)

(72) Inventor: Brian A. Harkins, Dover, PA (US)

(73) Assignee: ADHESIVES RESEARCH, INC., Glen Rock, PA (US)

( * ) Notice: Subject to any disclaimer, the term of this patent is extended or adjusted under 35 U.S.C. 154(b) by 77 days.

(21) Appl. No.: 13/852,293

(22) Filed: Mar. 28, 2013

(65) Prior Publication Data

US 2013/0260171 A1    Oct. 3, 2013

Related U.S. Application Data

(60) Provisional application No. 61/617,900, filed on Mar. 30, 2012.

(51) Int. Cl.
| | | |
|---|---|---|
| *C09J 9/02* | (2006.01) | |
| *C09J 7/02* | (2006.01) | |
| *C09D 5/24* | (2006.01) | |

(52) U.S. Cl.
CPC ... *C09J 9/02* (2013.01); *C09D 5/24* (2013.01); *C09J 7/0292* (2013.01); *C09J 7/0296* (2013.01); *C09J 2203/322* (2013.01); *C09J 2400/163* (2013.01); *C09J 2433/00* (2013.01); *Y10T 156/10* (2015.01); *Y10T 428/12438* (2015.01)

(58) Field of Classification Search
USPC ........... 136/267; 156/1–943; 333/12; 310/45; 216/2–99; 174/1–212; 428/1.1–543
See application file for complete search history.

(56) References Cited

U.S. PATENT DOCUMENTS

| | | | | |
|---|---|---|---|---|
| 2,808,352 | A * | 10/1957 | Coleman et al. | 428/560 |
| 3,475,213 | A * | 10/1969 | Stow | 428/328 |
| 4,767,674 | A * | 8/1988 | Shirai et al. | 428/461 |
| 5,506,059 | A * | 4/1996 | Robbins et al. | 428/457 |
| 5,665,219 | A * | 9/1997 | Yu | 205/182 |
| 6,329,722 | B1 * | 12/2001 | Shih et al. | 257/786 |
| 6,410,137 | B1 * | 6/2002 | Bunyan | 428/356 |
| 2002/0150775 | A1 * | 10/2002 | Ishikawa et al. | 428/458 |
| 2005/0208251 | A1 * | 9/2005 | Aisenbrey | 428/40.1 |
| 2010/0209699 | A1 * | 8/2010 | Nakayama et al. | 428/323 |
| 2011/0151331 | A1 * | 6/2011 | Sato | 429/233 |
| 2011/0318573 | A1 * | 12/2011 | Nakao et al. | 428/334 |
| 2012/0308815 | A1 * | 12/2012 | Buzoujima et al. | 428/341 |
| 2014/0352752 | A1 * | 12/2014 | Kim et al. | 136/244 |

FOREIGN PATENT DOCUMENTS

| | | | |
|---|---|---|---|
| CN | 202 088 562 U | 12/2011 | |
| EP | 2 146 355 A1 | 1/2010 | |
| EP | 2 399 968 A2 | 12/2011 | |
| EP | 2 426 735 A1 | 3/2012 | |
| EP | 2 599 846 A1 | 6/2013 | |
| WO | 02/20686 A2 | 3/2002 | |
| WO | WO 2010/053859 A2 * | 5/2010 | ........... H01L 31/042 |
| WO | 2011/093214 A1 | 8/2011 | |

* cited by examiner

*Primary Examiner* — Jeremy C Norris
*Assistant Examiner* — Muhammed Azam
(74) *Attorney, Agent, or Firm* — McNees Wallace & Nutick LLC

(57) ABSTRACT

A charge collection tape includes a foil substrate and an adhesive layer laminated on the foil substrate. The foil substrate is constructed of an aluminum base foil having a conductive metal coating overlying and in direct contact with a non-oxidized surface of the aluminum base foil.

15 Claims, 2 Drawing Sheets

CHARGE COLLECTION SIDE ADHESIVE TAPE

CROSS-REFERENCE TO RELATED APPLICATIONS

This application claims the benefit of, and priority to, U.S. Application No. 61/617,900 filed Mar. 30, 2012, which is hereby incorporated by reference in its entirety.

FIELD

The present disclosure is directed to the field of adhesive tapes and more particularly to charge collection tapes that may be used in solar and electronic devices.

BACKGROUND

Manufacturing industries are constantly searching for ways to produce high-performing products with lower-cost materials, while also improving product and manufacturing efficiencies. These goals can sometimes be met through original equipment manufacturers that drive the demand for such improvements through supplementary materials providers. In industries that rely upon electrical interconnections, charge collection tapes are a class of supplementary materials that can provide an economical way to make critical electrical interconnections.

Charge collection tapes have been used as grounding tapes, for EMI shielding, and interconnects in many different devices, such as mobile phones and other portable electronics. In recent years, charge collection tapes have found utility in solar applications and other applications that make use of photovoltaic cells.

Charge collection tapes consist of a metal foil carrier and an adhesive. Many charge collection tapes are high-performance adhesive tapes capable of withstanding temperature extremes, thermal cycling, damp heat exposure, and a number of other environmental stresses.

In solar applications, charge collection tapes are being investigated as cell stringing interconnects between photovoltaic cells to replace solder and silver filled electrically conductive adhesives (Ag-ECA), as well as for terminal bussing systems to collect charge from stringing ribbon or foil where a simple lamination can potentially replace the need for soldering to the bus bar foil. Charge collection tapes have also been useful in thin film designs in which the tape collects charge directly off the photovoltaic cell and transfers it to a second foil that carries the charge to a junction box outside the module. In all of these examples, the charge collection tape becomes an integral part of the photovoltaic design, and reliable adhesive and high-performing electrical interconnects are important for avoiding issues related to power loss or complete failure of a photovoltaic module.

The use of an adhesive laminated to copper foil as a charge collection tape is well known, including for use in solar applications. Copper foil is highly conductive, but has become increasingly expensive. Copper is also susceptible to oxidation and corrosion. In solar applications, that can be problematic because in many cases, the charge collection tape foil surface is in direct contact with the module encapsulant such as ethyl vinyl acetate (EVA) or polyvinyl butyral (PVB). Photo and thermal degradation of the encapsulant can generate corrosive species, such as acetic acid in the case of EVA, which can corrode the copper surface. This corrosion, while having a generally limited effect on performance, creates an undesirable aesthetic that can be commercially unacceptable by having an adverse effect on consumer interest in adopting solar technology.

Tin-coated copper foil generally performs better in these cases and is also known and widely used to form charge collection tapes. The tin protects the copper from oxidation and corrosion. In addition, the aesthetics of oxidized tin is quite often more appealing than that of copper. This is particularly true of copper foil treated with temporary antioxidants such as benzotriazole and other azole derivatives. These compounds form a myriad of colors when exposed to high temperature creating a visually unappealing foil surface, which can again have an adverse effect on consumer interest.

Tin coated copper foil has also been used successfully in conventional silicon wafer solar cells. Its proven track record has made it the foil of choice for most charge collection tapes for long life photovoltaic applications.

Unfortunately, however, the cost of copper and tin-coated copper foil carriers are quite expensive. In many cases the foil carriers make up a majority of the cost that goes into the charge collection tape. There is a need, therefore, to provide charge collection tapes that overcome these and other drawbacks, but which still provide high conductivity and good aesthetics.

SUMMARY

The present invention is directed to a low cost charge collection tape that makes use of a metal coated aluminum foil laminated with an adhesive.

According to an exemplary embodiment, a charge collection tape comprises a foil substrate and an adhesive layer laminated on the foil substrate. The foil substrate comprises an aluminum base foil having a conductive metal coating overlying and in direct contact with a non-oxidized surface of the aluminum base foil.

According to another exemplary embodiment, a method of making a charge collection tape comprises providing an aluminum foil, removing aluminum oxide from opposing first and second sides of the aluminum foil, coating the non-oxidized surfaces of the aluminum foil with at least one layer of a conductive metal to form a foil substrate and laminating an adhesive to the foil substrate to form the charge collection tape.

An advantage of exemplary embodiments is that charge collection tapes using an aluminum foil base can be used to form lighter weight constructions and can be manufactured at a lower cost than conventional charge collection tapes.

Another advantage of exemplary embodiments is that the use of an aluminum foil base for charge collection tapes results in such tapes having excellent corrosion resistance and that exhibit consistent performance and aesthetic appearance even after exposure to harsh environments.

Still another advantage of exemplary embodiments is that charge collection tapes in accordance with exemplary embodiments employ a conductive coating that protects an unoxidized surface of the aluminum base foil from exposure to oxygen, including that which may occur by puncture during ordinary use.

These and other advantages will be apparent from the following more detailed description of exemplary embodiments.

DETAILED DESCRIPTION OF EXEMPLARY EMBODIMENTS

The present invention is directed to a low cost charge collection tape that makes use of a metal coated aluminum foil laminated with an adhesive. Aluminum has comparable conductivity to that of copper (Al resistivity ~$2.655\times10^{-8}$ ohm-m) and exhibits good corrosion resistance, even in acidic environments. Aluminum also has a much lower density (2.70 gm/cc) than copper (8.94 gm/cc). As a result, light weight constructions can be employed when aluminum is used in place of copper. Aluminum foil pricing is also extremely attractive, currently available for a fraction of the price of copper.

Unfortunately, aluminum possesses an electrically insulative oxide layer, typically about 100 nm thick. While this oxide layer helps give aluminum its excellent corrosion resistance, it is also extremely insulative and impedes the flow of electrons at the interconnects. This can result in substantial resistive heating when significant currents (i.e., about 1 amp or more) are passed through this layer, such as are experienced, for example, in solar applications.

The aluminum oxide layer is very thin and can be easily penetrated when metals are brought in contact with it. While this direct aluminum to metal interconnect is highly conductive, if air is able to get to the interface via the penetration, the aluminum oxide will reform and resistive heating will occur, sometimes to the point of complete interconnect failure.

Because of these drawbacks, aluminum has not be considered within the art as suitable for use in charge collection tapes and it is believed that such use has been heretofore unknown.

However, exemplary embodiments overcome the drawbacks that might otherwise be associated with the use of aluminum by removing the insulative oxide and coating the aluminum with another metal to prevent the insulative oxide from reforming.

Figure 1:
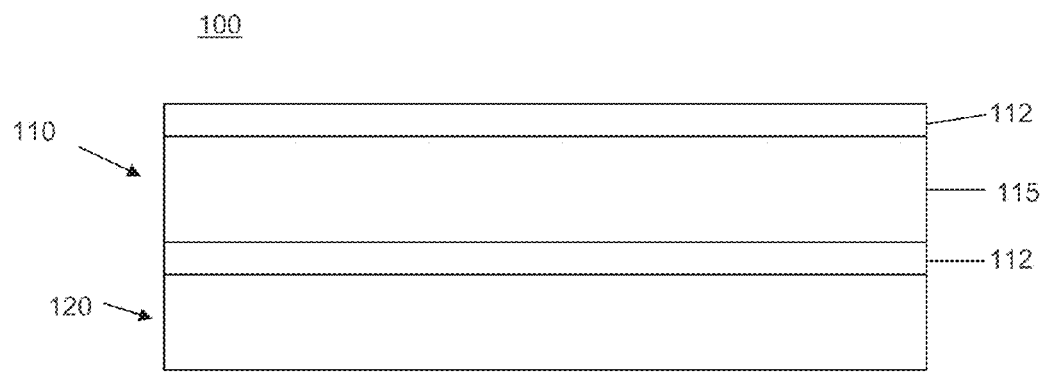
FIG. 1 is a schematic side view of a charge collection tape in accordance with an exemplary embodiment.

FIG. 1 schematically illustrates a side view of an exemplary charge collection tape 100 having a foil substrate 110 laminated on at least one side with an adhesive 120. While illustrated and discussed primarily with respect to a single faced tape, i.e., one in which the adhesive 120 is laminated on a single side of the foil, it will be appreciated that the charge collection tape 100 may also be a double faced tape, in which the adhesive 120 is laminated on both sides of the foil substrate 110. Single-faced tapes are primarily used to collect charge from one substrate and transfer it in the XY plane (i.e. the length and width direction of the tape) via the conductive foil to a second substrate (e.g., bus bar tape) while double faced tapes are well-suited for use as Z-axis (i.e. the thickness direction of the tape) electrical interconnects or as bus bar foils. Double-faced tapes can collect a charge from one substrate and transfer it to a second substrate on the opposite side of the foil, in addition to transferring in the XY plane.

The foil substrate 110 comprises a base foil 115 of aluminum. It will be appreciated that by "aluminum" is meant both aluminum metal as well as aluminum base alloys, including those aluminum alloys commonly used in foil production. Preferably, the base foil 115 is a 1000 or 1100 series aluminum alloy. The base foil 115 is typically flat, but may also be embossed.

The aluminum oxide is removed from the surface of the base foil 115, which may be accomplished by acid etching, although any other method of removing the oxide from the base foil 115 may be employed, including mechanical polishing or sandblasting, for example. To prevent re-oxidation of the aluminum surface, which can occur almost immediately upon exposure to air or other oxygen rich environment, the oxide removal is typically carried out in an acid bath, if acid etching is used, or in conjunction with some other oxygen free environment, such as under vacuum or under a curtain of nitrogen or inert gas such as argon.

After removing the oxide layer and prior to re-exposure to air or other significant source of oxygen, a thin metal coating 112 is applied to the non-oxidized surfaces of the base foil 115. The metal coating 112 provides a conductive layer of metal that prevents the oxide from reforming on the surface of the aluminum base foil 115. The metal may be coated by any suitable process used to apply one metal layer to another. Suitable techniques include, but are not limited to, electroplating, dipping, and cladding and may in some cases depend upon the particular metal to be coated on the aluminum and the source of that metal.

The composition of the metal coating 112 may be selected from highly conductive metals that are more resistant to oxide formation and/or in which the metal oxide still exhibits some conductivity. Metals with these properties include gold, silver, tin, nickel, copper, platinum, palladium, and zinc, and alloys containing one or more of these metals, all by way of example only. It will be appreciated that the metal coating 112 may be made up of a single layer of conductive metal applied to the base foil 115 or it may be multiple layers of separately applied metal. If multiple layers are employed in forming the metal coating 112, the composition of the different layers are typically different. In one exemplary embodiment, the base foil 115 has a metal coating 112 which is a layer of copper overlaid by a layer of tin. In another embodiment, the foil substrate 110 may include a base foil 115 having a metal coating 112 of tin over nickel over copper.

Charge collection tapes are typically thin and flexible; accordingly the base foil 115 and ultimately the foil substrate 110 may be of any thickness that permits the tape to be wound and unwound in roll form and laminated with ordinary pressure to surfaces with platens, rollers, and nip laminators. Typically, the overall thickness of the foil substrate 110 is in the range of 0.00024 in. (6.1 microns) to 0.0050 in. ($1.3\times10^2$ microns), with the majority of the thickness attributable to the base foil 115. Each layer of the metal coating 112 may be from about $3.9\times10^{-6}$ in. (0.10 microns) to about 0.00039 in. (10 microns) thick, which may depend on the composition of the metal employed. Preferably, each layer of the metal coating 112 is between about $3.9\times10^{-6}$ in (0.10 microns) to about 0.00020 in. (5.0 microns) thick.

The foil substrate 110 thus provided, the adhesive 120 is laminated thereto to form the charge collection tape 100, which as previously described may be either a single faced or double faced tape. The adhesive 120 is typically low-outgassing and non-corrosive, which can help to preserve the integrity, efficiency, and product aesthetics. Any adhesive suitable for use in other charge collection tapes may also be used in forming charge collection tapes in accordance with exemplary embodiments.

The adhesive 120 may be a pressure sensitive adhesive, heat seal adhesive, thermoset adhesive, and/or a radiation cured adhesive. However, if the adhesive 120 is to be photo or thermally cured, it should be selected to still remain flexible. While not wishing to be bound by theory, the use of an adhesive 120 in accordance with exemplary embodiments that exhibits a long-term non-rigid nature is believed to help mitigate wear of the metal coating 112 on the aluminum base foil 115 by way of lubricating the surface and dampening stress at the interconnect.

The adhesive 120 is typically applied to a thickness between about 0.00020 in. (5.1 microns) and about 0.0050 in. (127 microns). Preferably, the adhesive 120 is between about 0.00050 in. (12.7 microns) and about 0.003 in. (76.2 microns) thick.

The adhesive 120 may be a non-conductive adhesive, but is preferably a conductive adhesive. A conductive adhesive may be formulated by adding conductive fillers, typically between 0.1% and 90% by weight, to a suitable non-conductive adhesive formulation, including acrylic-base, silicone-base, rubber-base, polyester-base and urethane-base adhesives by way of example only. One suitable conductive adhesive is the conductive acrylic adhesive available as EL-9032 available from Adhesives Research, Inc. of Glen Rock, Pa. Other suitable conductive adhesives include, again by way of example, those described in PCT/US2011/061988 filed Nov. 23, 2011 and published as WO2012/074184, which is hereby incorporated by reference.

Conductive fillers include metals such as silver, gold, nickel, copper, tin, and alloys thereof; conductive polymers; carbon black; carbon fiber; graphite; graphene; carbon nanotubes; and metalized carbon fiber, as well as metal coated glass beads, metal coated glass flakes/fibers, and metal coated nickel particles, all by way of example. The metal coating of the conductive filler particles can be any conductive metallic material such as silver, gold, copper, etc. The particle shape is not limited, and may include spheres, flakes, and irregularly shaped particles. Likewise, particle size is not limited, and may include sizes well below the thickness of the adhesive 120 up to particles large enough to span the entire bondline thickness of the adhesive 120. In some embodiments, the average diameter of the particles is approximately equal to the thickness of the adhesive 120.

The force applied during lamination of the adhesive 120 or application of the charge collection tape 110 during its subsequent use could in some instances cause conductive particles in the conductive adhesive to penetrate the surface of the foil substrate 110. However, even if that were to occur, the metal coating 112 further acts to provide a protective feature. While the penetration may result in exposure of regions of the foil substrate 110 beneath the surface to oxygen, the presence of the metal coating 112 can prevent the oxygen from reaching the underlying aluminum base foil 115. While an oxide of the metal coating 112, such as copper oxide, may form as a result of exposure to air, oxides of highly conductive metals such as copper oxide are still somewhat conductive and less likely to impede performance, unlike the deleterious strongly insulating properties of aluminum oxide that could form areas of high contact resistance.

EXAMPLES

The invention is further described by way of the following examples, which are presented by way of illustration, not of limitation.

Example 1

A first example of a charge collection tape was created using a 0.004 in (102 microns) thick aluminum foil (aluminum alloy 1145) that was plated on both sides with 40 to 50 microinches (1.02 to 1.27 microns) of copper. The aluminum foil was prepared by etching away the aluminum oxide with a corrosive solution followed by rinsing and subsequent electroplating with the copper. A 0.001 in. (25.4 microns) thick layer of a conductive adhesive (EL-9032 available from Adhesives Research, Inc. of Glen Rock, Pa.) was thereafter laminated to one side of the coated foil.

Example 2

A second example of a charge collection tape was prepared in a like manner, except that an additional layer of 100 to 110 microinches (2.54 to 2.79 microns) of tin was electroplated over the 40 to 50 microinches (1.02 to 1.27 microns) of copper prior to laminating the coated foil with the same adhesive.

Comparative Example

A comparative example was provided by way of a 0.004 in (0.102 mm) thick aluminum foil (aluminum alloy 1145) that was laminated with the same adhesive without any further preparation or application of a conductive coating.

Test 1

In a first test, samples from each of the foregoing three tapes were cut into 0.25 in. by 8 in. strips (0.64 cm by 20.3 cm). The strips were placed on a flat surface and a set of four point probes were connected to a Keithley MicroOhmeter. The four point probes were placed on either the foil or adhesive side of each sample, 0.25 in. (0.64 cm) apart. The sheet resistance was recorded for each side of each sample in mOhm. The sheet resistances (R) were converted to bulk resistivity ($\rho$) using the following equation:

$$\rho = (R/1000)*t$$

where, $\rho$=bulk resistivity as measured in ($\Omega$-cm); R=sheet resistance as measured in (m $\Omega$/□); and t=foil thickness as measured in (cm).

Three replicates were tested for each sample. The average for the three data points is reported in Table 1, which shows both the measured sheet resistance and the calculated bulk resistivity. The calculated bulk resistivity was compared with the bulk resistivity literature value for aluminum of between 2.6 to 2.8×10$^{-6}$ ohm-cm.

TABLE 1

| Sample | Sheet Resistance (mOhm/□) | | Calculated Bulk Resistivity (ohm-cm) | |
|---|---|---|---|---|
| | Foil Side | Adhesive Side | Foil Side | Adhesive Side |
| Comp. Ex. | 0.26 | 0.26 | 2.64E−06 | 2.64E−06 |
| Ex. 1 | 0.27 | 0.275 | 2.74E−06 | 2.79E−06 |
| Ex. 2 | 0.245 | 0.255 | 2.49E−06 | 2.59E−06 |

Test 2

In a second test using the tapes of Examples 1 and 2 and the Comparative Example, a ramp and hold test was conducted. Overlap joints were prepared by overlapping a 0.5 in. by 4 in. (1.27 cm by 10.4 cm) strip of tin-coated copper foil having a thickness of 1.4 mil (35.6 micron) with a 0.25 in. (0.64 cm) wide and 4 in. (10.4 cm) long strip of the tape constructions from the two examples and the comparative example onto a glass plate. Each of the sample overlap joints were cured at 150° C. for 10 minutes under 25 psi (172.4 kPa) to simulate a typical EVA encapsulation condition for photovoltaic modules. The samples were then allowed to cool to room temperature.

Current was applied across the overlap joint and the voltage was recorded, from which the resistance could be calculated using Ohm's law. Current was applied at each of 1, 5, and 10 amps. At 10 amps, the current was held at that level for 30 minutes. After the 30 minute dwell at 10 amps, the current was cycled back down to 1 amp. Again, the voltage was recorded at 1, 5, and 10 amps. The tests were conducted inside a Teflon box.

Figure 2:
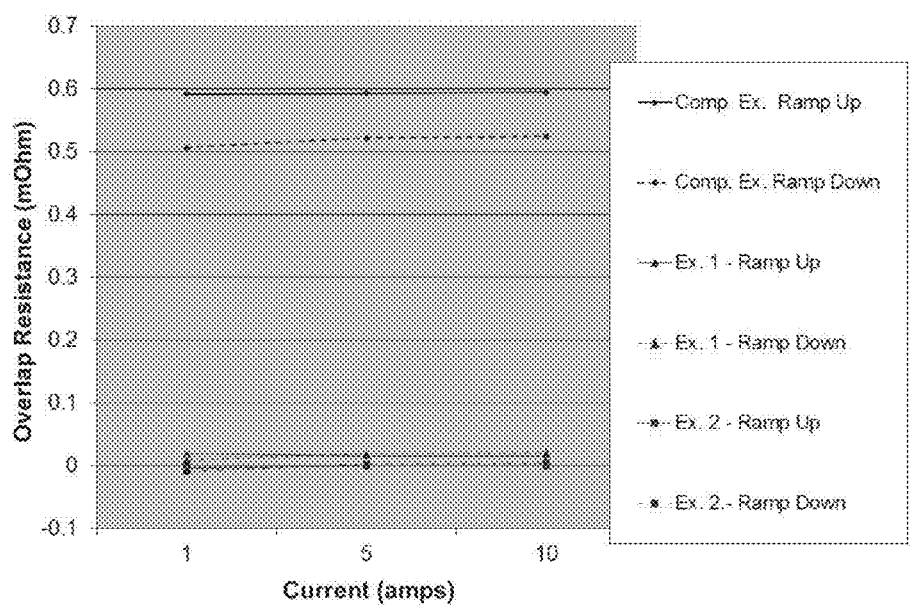
FIG. 2 graphically illustrates calculated resistance of charge collection tapes in accordance with exemplary embodiments with respect to a reference example, in which FIG. 2a provides an enlarged view of the results of the exemplary embodiments.
Figure 2A:
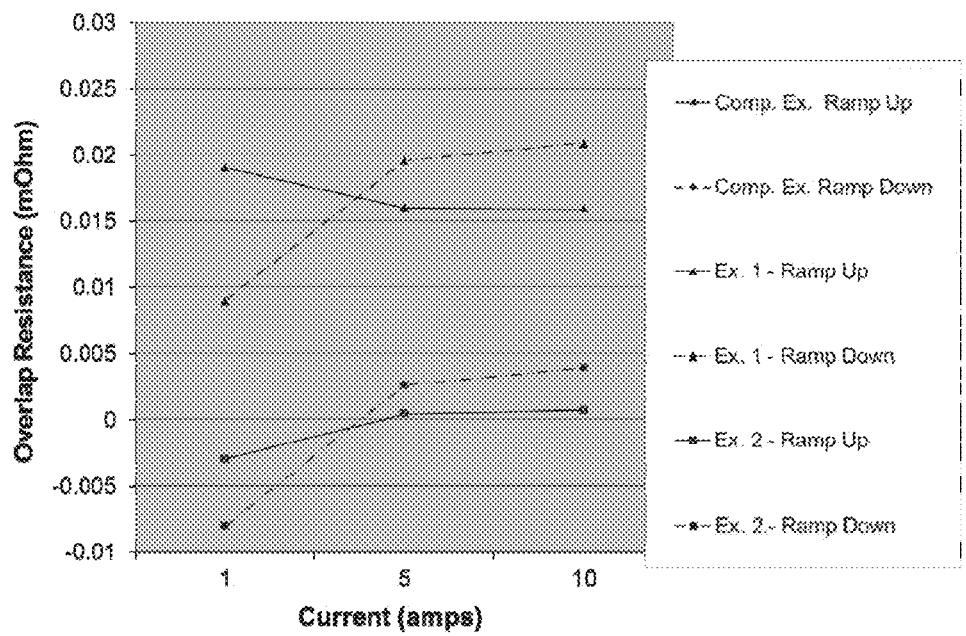

FIG. 2 graphically illustrates the calculated resistance for each of the three samples at each of the current points both during ramp up and during ramp down, in which the tapes from each of Examples 1 and 2 can be seen to exhibit a much lower resistance than the Comparative Example. FIG. 2a is an enlarged section of the graph that illustrates the measured changes of Examples 1 and 2.

Figure 3:
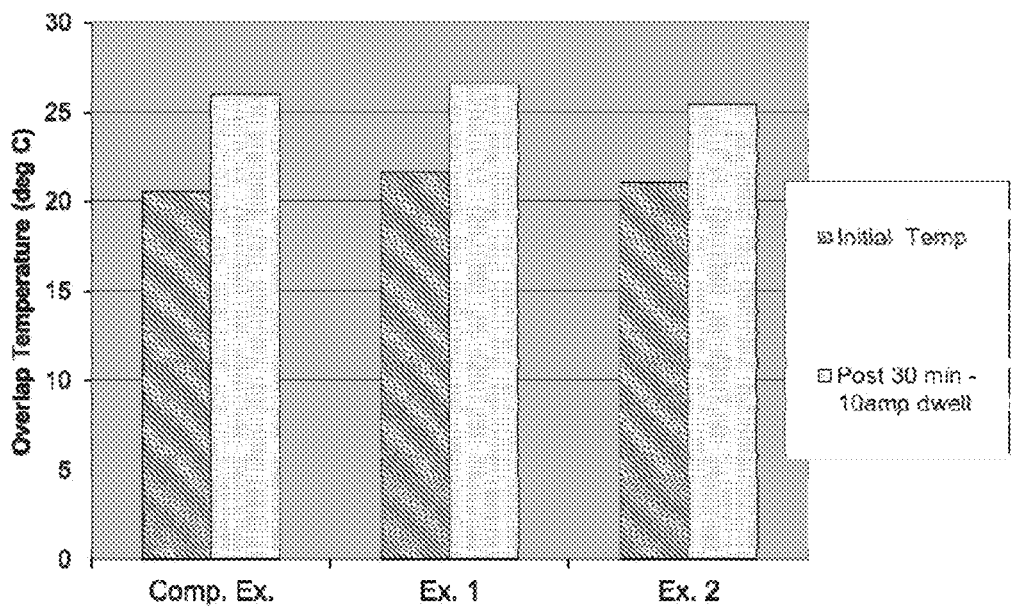
FIG. 3 graphically illustrates measured temperatures during testing of charge collection tapes in accordance with exemplary embodiments with respect to a reference example.

Additionally, the overlap temperature was measured both before and after the 30 minute dwell at 10 amps by using a thermocouple placed on the bottom glass panel, at the overlap joint, outside the test sample. FIG. 3 graphically illustrates the temperatures measured for each of the three samples.

Test 3

In a third test, the effect of applied current to the sample tapes over time was observed. Overlap joints were prepared by overlapping a 0.5 in. by 4 in. (1.27 cm by 10.4 cm) strip of tin-coated copper foil having a thickness of 1.4 mil (35.6 micron) with a 0.25 in. (0.64 cm) wide and 4 in. (10.4 cm) long strip of the tape constructions from each of Examples 1 and 2 and the Comparative Example onto a glass plate. Each of the sample overlap joints were cured at 150° C. for 10 minutes under 25 psi (172.4 kPa) to simulate a typical EVA encapsulation condition for photovoltaic modules. The samples were then allowed to cool to room temperature.

The overlap joints were then thermally cycled while continuously passing a 10 amp current through the overlap for one week, with the voltage recorded every thirty seconds. The maximum recorded resistance for each sample is shown below in Table 2, along with the maximum temperature differential as calculated by comparing the temperature measured at the interconnect with respect to ambient temperature.

TABLE 2

| Sample | Maximum Temperature Delta during test (deg C.) | Maximum Resistance during test (mOhm) |
| --- | --- | --- |
| Comp. Ex. | 75 | 59 |
| Ex. 1 | 25 | 0.2 |
| Ex. 2 | 5 | 0.12 |

At the end of the week, the overlap joints were also visually observed from both the front and back. The Comparative Example exhibited signs of overheating and destruction at the interconnect, while Examples 1 and 2 both withstood the test in a satisfactory manner. The tape of Example 1 demonstrated good interconnect quality while exhibiting some minor discoloration; the tape of Example 2 was observed to be in almost pristine condition with respect to both interconnect quality and aesthetics.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A charge collection tape comprising:
a foil substrate; and
an adhesive layer laminated on the foil substrate,
wherein the foil substrate comprises an aluminum base foil having a conductive metal coating overlying and in direct contact with a non-oxidized surface of the aluminum base foil and wherein the conductive metal coating comprises a layer of copper overlaid by tin.

2. The charge collection tape of claim 1, wherein the aluminum base foil is a 1000 or 1100 series aluminum alloy.

3. The charge collection tape of claim 1, wherein the thickness of the foil substrate is in the range of 0.00024 inches to 0.005 inches.

4. The charge collection tape of claim 1, wherein the metal coating has a thickness in the range of 0.1 microns to 10 microns.

5. The charge collection tape of claim 1, wherein the metal coating comprises at least one layer of a conductive metal having a thickness in the range of 0.1 microns to 5 microns.

6. The charge collection tape of claim 1, wherein the adhesive is a conductive acrylic adhesive.

7. The charge collection tape of claim 6, wherein the adhesive contains in the range of 0.1% to 90% by weight of conductive fillers.

8. A charge collection tape comprising:
a foil substrate having a thickness in the range of about 0.0005 inches to about 0.005 inches comprising a base foil of an aluminum alloy with a multi-layer conductive metal coating overlying and in direct contact with opposing non-oxidized surfaces of the aluminum base foil, the conductive metal coating comprising a layer of copper overlaid by tin; and
an adhesive layer laminated on the foil substrate, the adhesive comprising a conductive acrylic adhesive.

9. A method of making a charge collection tape comprising:
providing an aluminum foil;
removing aluminum oxide from opposing first and second sides of the aluminum foil to produce non-oxidized surfaces of the aluminum foil;
coating the non-oxidized surfaces of the aluminum foil with at least one layer of a conductive metal to form a foil substrate; and
laminating an adhesive to the foil substrate.

10. The method of claim 9, wherein the step of removing includes acid etching.

11. The method of claim 9, wherein the step of coating comprises coating with a metal selected from the group consisting of gold, silver, tin, nickel, copper, platinum, palladium, zinc, and alloys thereof.

12. The method of claim 9, wherein the step of coating comprises coating the non-oxidized surfaces of the aluminum foil with a first layer of a conductive metal and thereafter coating the first layer of a conductive metal with a second layer of a conductive metal, the conductive metal of the second layer different from the conductive metal of the first layer.

13. The method of claim 12, wherein the conductive metal of the first layer is copper and the conductive metal of the second layer is tin.

14. The method of claim 9, wherein the step of laminating comprises laminating with a conductive acrylic adhesive.

15. The method of claim 9, wherein the step of laminating comprises laminating an adhesive to a single face of the foil substrate.

* * * * *